(12) United States Patent
So

(10) Patent No.: US 9,430,796 B1
(45) Date of Patent: Aug. 30, 2016

(54) DIRECT PURCHASE FROM USER-RECEIVED ADVERTISEMENT

(71) Applicant: GOOGLE INC., Mountain View, CA (US)

(72) Inventor: Wai Kei So, Daly City, CA (US)

(73) Assignee: GOOGLE INC., Mountain View, CA (US)

( * ) Notice: Subject to any disclaimer, the term of this patent is extended or adjusted under 35 U.S.C. 154(b) by 183 days.

(21) Appl. No.: 14/055,477

(22) Filed: Oct. 16, 2013

(51) Int. Cl.
*G06Q 30/06* (2012.01)
*G06Q 30/02* (2012.01)

(52) U.S. Cl.
CPC ...... *G06Q 30/0633* (2013.01); *G06Q 30/0241* (2013.01)

(58) Field of Classification Search
CPC .............................. G06Q 30/06; G06Q 30/08
USPC ................................................. 705/26.1–27.2
See application file for complete search history.

(56) References Cited

U.S. PATENT DOCUMENTS

| | | | |
|---|---|---|---|
| 5,960,411 A * | 9/1999 | Hartman et al. ........... | 705/26.81 |
| 2008/0010120 A1 * | 1/2008 | Chung .................. | G06Q 30/02 705/26.1 |
| 2008/0046338 A1 | 2/2008 | Tarvydas et al. | |
| 2008/0270246 A1 | 10/2008 | Chen | |
| 2009/0144194 A1 | 6/2009 | Dickelman | |
| 2011/0276418 A1 | 11/2011 | Velani | |
| 2012/0166268 A1 * | 6/2012 | Griffiths ..................... | 705/14.23 |
| 2012/0323684 A1 * | 12/2012 | Rothman ........... | G06Q 30/0271 705/14.53 |

OTHER PUBLICATIONS

U.S. Appl. No. 13/831,051 to Whang et al. filed Mar. 14, 2013.
O'Mahoney, et al., 7 Electronic Payment Systems, *Multimedia im Netz*, Jun. 13, 1997.

* cited by examiner

*Primary Examiner* — Ethan D Civan
*Assistant Examiner* — Ming Shui
(74) *Attorney, Agent, or Firm* — Johnson, Marcou & Isaacs, LLC

(57) ABSTRACT

An advertised product is associated with an option to directly purchase the advertised product. A payment processing system receives an input from a user device of a selection on the user device of the option to directly purchase the advertised product. In response to receiving the input from the user device to directly purchase the advertised product, a time-out period for modifying the selection of the option to directly purchase the advertised product is provided. When the payment processing system determines that the time-out period for modifying the selection to directly purchase the advertised product has expired, the payment processing system automatically completes a purchase of the advertised product on behalf of the user. If, however, the payment processing system receives a modification input from the user before the time-out period expires, the payment processing system ceases the automatic purchase transaction and processes the received modification input.

20 Claims, 6 Drawing Sheets

DIRECT PURCHASE FROM USER-RECEIVED ADVERTISEMENT

TECHNICAL FIELD

The present disclosure relates generally to online shopping, and more particularly to purchasing a product directly from an online advertisement presented to a user.

BACKGROUND

In a conventional online purchase transaction, a consumer conducts online activity, such as searching for a product or browsing websites offering the product for sale. With a product search, for example, the search engine returns results for the product, usually along with links to particular merchants that sell the product. By clicking on a link, the consumer is redirected to the merchant's website. There, the consumer must typically browse various products on the merchant's website to identify the specific product of interest. Once the specific product is identified, the consumer oftentimes must navigate to an additional merchant webpage that is specific to the product.

If after locating the specific product the consumer decides to actually purchase the product, additional consumer activity is typically necessary. For instance, the consumer must indicate a desire to purchase the product, such as by accessing a product-purchase link on the merchant's webpage, such as a "cart." Thereafter, the consumer may be redirected to a payment processing page, where the consumer must enter consumer credentials to complete the transaction, such as the billing address, shipping address, and payment account information of the consumer.

By the time a conventional product purchase transaction is complete, a consumer will thus have navigated through numerous web pages. The consumer will have also participated in several consumer-driven decisions, such as which links to select from the search engine product search results page or which specific product to select from the merchant's website offering numerous product choices. All of these activities—navigating numerous webpages and making decisions about products of interest—can be burdensome to a consumer. As such, the conventional product purchase transaction often hinders consumer convenience as well as consumer impulse buying.

SUMMARY

In certain example aspects described herein, a computer-implemented method for direct product purchasing is provided. A payment processing system receives an input from a user computing device of a selection on the user computing device of an option to directly purchase an advertised product. The advertised product is associated with the option to directly purchase the advertised product. In response to receiving the input from the user computing device to directly purchase the advertised product, the payment processing system provides a time-out period for modifying the selection on the user computing device of the option to directly purchase the advertised product. If the payment processing system determines that the time-out period for modifying the selection to directly purchase the advertised product has expired, the payment processing system automatically completes a purchase of the advertised product on behalf of the user.

In certain other example aspects, a system for direct product purchasing is also provided. Also provided in certain aspects is a computer program product for direct product purchasing.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
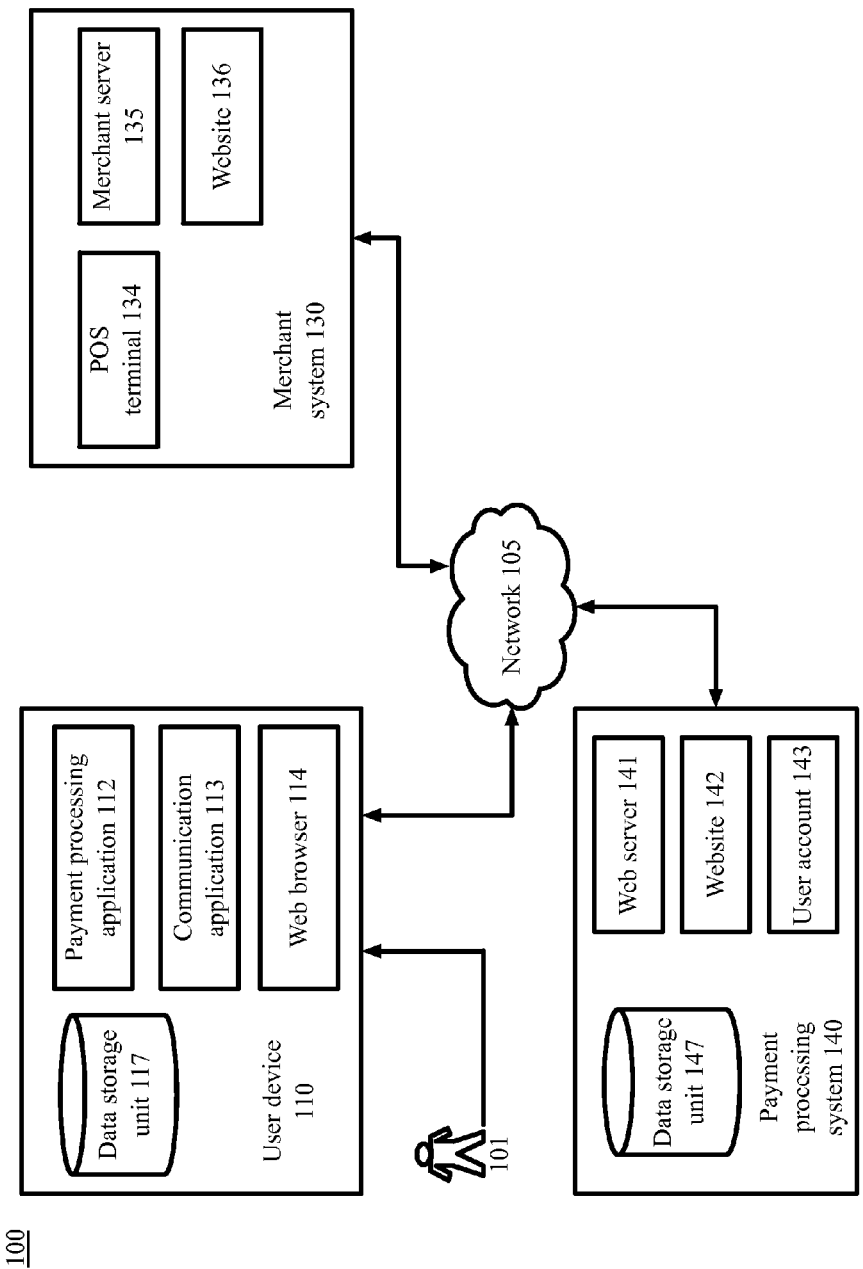
FIG. 1 is a block diagram depicting a system for processing direct purchases from an online advertisement, in accordance with certain example embodiments.

As disclosed herein, a payment processing system enables a user to purchase a product directly from an advertisement presented on a user device. When a user conducts online activity, a payment processing application, for example, identifies a product advertisement presented via the user device. The payment processing application then associates an option to directly purchase the advertised product with the advertisement. The user selects the direct purchase option, for example, by "clicking" or "tapping" the advertisement or other control. Based on the user's selection, the payment processing application provides a time-out period in which the user can modify the user's selection to directly purchase the advertised product. Before expiration of the time-out period, the user may modify the direct purchase selection. For example, the user may modify payment or shipping information for the transaction or cancel the transaction completely. If the time-out period expires without a modification from the user, the payment processing system automatically completes the purchase of the advertised product on behalf of the user.

More particularly, in certain examples, a user registers with the payment processing system. For example, the user may provide the user's name and other information so that the payment processing system can create an account (or record) for the user. As part of the registration, the user associates one or more financial accounts with the payment processing system, such as a digital wallet account or other payment account, that the payment processing system can employ to make purchases on behalf of the user. The user also provides additional user payment information, such as the billing address associated with the financial accounts of the user. The user may also provide a shipping address to receive products.

To obtain the benefits of the methods and techniques described herein, the user may have to select a setting on the user computing device—or install an application on the user device—that allows the payment processing system to send and receive information regarding the user to and from the user device. For example, the user may install a payment processing application on the user device, which facilitates the transmission of such information. The payment processing application, for example, may also identify advertisements presented to the user as described herein, and thereafter associate an option for the user to directly purchase the advertised product.

Following user registration, the payment processing system receives a direct purchase option selection from the user device. For example, the user conducts online activity, such as browsing websites. As the user conducts online activity, the user is presented with advertisements for various products on the user interface of the user device, for example. After receiving the product advertisements, the payment processing application, for example, associates an input option for the user to directly purchase the advertised product from the advertisement. For example, the input option allows the user to "click" or "tap" on the advertisement or on a control associated therewith directly as the advertisement is presented on the user device, thus initiating a direct purchase of the advertised product.

By providing the input on the advertisement or control associated therewith, such as the "click" or "tap," or other control, the user provides an indication that the user desires to purchase the advertised product directly from the advertisement. Based on the input, the user device communicates the input selection to the payment processing system, such as via the payment processing application, along with information regarding the advertisement and the user. The payment processing system then receives the direct purchase option selection of the user, along with the associated information. Based on the received information, the payment processing system identifies the record of the user associated with the payment processing system, such as the user account. The payment processing system then determines, for example, the payment and shipping information of the user from the user account.

After identifying the user account of the user, the payment processing system provides a time-out period for modifying the direct purchase selection of the user. The time-out period provides the user with an opportunity to change or cancel the direct purchase selection that initiated the direct purchase transaction for the advertised product. For example, the payment processing application provides the user with a modification input option to change the transaction, such as a user control option to "modify" or "cancel" the transaction before the time-out period expires. By providing the modification input, the user can thus modify the initial direct purchase selection before the payment processing system automatically completes the direct purchase option on behalf of the user as described herein. In certain examples, the payment processing application may also provide a time-out clock on a user interface of the user device, along with the user control option for modifying the initial user selection. By monitoring the clock, the user can determine the amount of time remaining for modification of the initial direct purchase selection. Alternatively, the user may navigate away from the time-out clock, such as to a different website, thus allowing the time-out period to expire without monitoring the time-out clock. The user may also close the browser displaying the advertisement.

In certain examples, the payment processing system also provides the user with the determined payment or shipping information so that the user can verify the information. For example, before the time-out period begins, the payment processing system may communicate the user payment or shipping information to the payment processing application. Upon receipt of the information, the payment processing application presents the payment or shipping information (or both) on the user interface of the user device during the time-out period for modifying the direct purchase transaction.

Based on the presented user payment or shipment information, the user may determine that certain information needs to be modified, such as the financial account to be used to pay for the advertised product. Additionally or alternatively, after reviewing the shipping address the user may determine that the product needs to be shipped to a different address. Hence, the user provides modification input to "modify" the direct purchase selection, and the payment processing system receives the modification input. Additionally or alternatively, the user may choose to modify the direct purchase transaction by completely canceling the direct purchase transaction during the time-out period. The user thus provides a modification input to "cancel" the transaction, and the payment processing system receives the modification input.

In response to receiving a modification input before the time-out period expires, the payment processing system ceases the automatic purchase transaction and processes the user selection to modify the purchase transaction. For example, if the modification input is a "cancel" input, the payment processing system cancels the automatic purchase transaction entirely. If the modification input is a "modify" input, the payment processing system, such as via the payment processing application, may direct the user to a user interface where the user can modify information, such as the payment and shipping information for the purchase transaction. The payment processing system may then proceed to complete the purchase transaction on behalf the user as described herein, using the modified information.

If the payment processing system does not receive a modification input before the time-out period expires, the payment processing system—based on the expired time-out period—automatically facilitates the direct purchase of the advertised product on behalf of the user. That is, the payment processing system uses the account information of the user to complete the transaction for the advertised product with the merchant, without any additional input from the user. For example, the payment processing system determines, based on the content of the advertisement, the identity of the merchant associated with the advertisement. The payment processing system then communicates the transaction information to the merchant so that the merchant can, for example, verify that the advertised product is still available.

After the payment processing system receives confirmation that the advertised product remains available, for example, the payment processing system processes payment for the advertised product. For example, the payment processing system charges the financial account of the user for the advertised product and provides payment for the product to the merchant. The payment processing system then communicates shipping information of the user to the merchant so that the merchant can provide the advertised product to the user. In certain examples, the payment processing system may provide the user's payment account information to the merchant, which the merchant uses to process payment of the advertised product.

In certain examples, after the payment processing system automatically facilitates competition of the direct purchase transaction of the advertised product, the payment processing system may notify the user that the transaction was successful. For example, the payment processing system may provide the user with an indication via the user interface that the transaction was successful. Additionally or alternatively, the payment processing system may provide the user with an email or text-message alert, for example, that the transaction was successfully completed. In certain example embodiments, when the time-out period expires, the payment processing system may, such as via the payment processing application, present a confirmation on a user interface of the user device that the payment processing system will automatically complete a direct purchase of the advertised product on behalf of the user.

By using and relying on the methods and systems described herein, the payment processing system allows a user to directly purchase an advertised product without having to visit several webpages, for example, to complete the transaction. Rather, by "clicking" or "tapping" a product advertisement or other control directly, the methods and systems described herein allow the user to purchase the advertised product with a single click, while also providing the user an opportunity to modify the direct purchase option selection within a certain time period. The methods and systems described herein thus enhance the online shopping experience of the user.

Example System Architectures

Turning now to the drawings, in which like numerals indicate like (but not necessarily identical) elements throughout the figures, example embodiments are described in detail.

FIG. 1 is a block diagram depicting a system 100 for direct product purchasing, in accordance with certain example embodiments.

As depicted in FIG. 1, the example operating environment 100 includes a user network computing device 110, a merchant computing system 130, and a payment processing system 140 that communicate with each other via one or more networks 105. In another example embodiment, two or more of these systems (including systems 110, 130, and 140) or parts thereof are integrated into the same system. In certain example embodiments, a user 101 associated with a user device 110 must install an application and/or make a feature selection on the user device 110 to obtain the benefits of the methods and techniques described herein.

Each network 105 includes a wired or wireless telecommunication means by which network computing devices (including devices 110, 130, and 140) can exchange data. For example, each network 105 can include a local area network ("LAN"), a wide area network ("WAN"), an intranet, an Internet, a storage area network ("SAN"), a personal area network ("PAN"), a metropolitan area network ("MAN"), a wireless local area network ("WLAN"), a virtual private network ("VPN"), a cellular or other mobile communication network, Bluetooth, near field communication ("NFC"), or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 130, and 140 includes a communication module capable of transmitting and receiving data over the network 105. For example, each network device 110, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 130, and 140 are operated by end-users or consumers, merchant system operators, and payment processing system operators, respectively.

The user 101 can employ the communication application 113, such as a web browser application 114 or a stand-alone application, to view, download, upload, or otherwise access documents or web pages via a distributed network 105. The communication application 113 of the user computing device 110 can interact with web servers or other computing devices connected to the network 105. For example, the communication application 113 can interact with the user network computing device 110, the merchant system 130, and/or the payment processing system 140. The communication application 113 may also interact with a web browser 114, which provides a user interface, for example, for accessing other devices associated with the network 105.

The user computing device 110 may include a payment processing application 112. The payment processing application 112, for example, communicates and interacts with the payment processing system 140, such as via that the communication application 113 and the network 105. The payment processing application 112, for example, may be configured, based on user preferences, to obtain, receive, and communicate user information, such as account information, to the payment processing system 140. The payment processing application 112 may also be configured to recognize a merchant advertisement associated with the web browser 114, for example.

The user computing device 110 may also include a digital wallet application module (not shown). The digital wallet application module may encompass any application, hardware, software, or process of the user device 110 that the user 101 may employ to assist the user 101 in completing a purchase transaction. For example, the digital wallet application module may be configured to interact with a user account 143 of the payment processing system 140, such as via the network 105. The digital wallet application module may also be configured to interact with the communication application 113 and the payment processing application 112. In certain example embodiments, the digital wallet application module may be embodied as a companion application of the payment processing application 112. As a companion application, the digital wallet application module may execute and operate within the payment processing application 112, for example. Additionally or alternatively, the digital wallet application module may execute and operate independently of the payment processing application 112.

The user computing device 110 may further include a data storage unit 117. The example data storage unit 117 can include one or more tangible computer-readable storage devices. The data storage unit 117 can be a component of the user device 110 or be logically coupled to the user device 110. For example, the data storage unit 117 can include on-board flash memory and/or one or more removable memory cards or removable flash memory. In certain example embodiments, the data storage unit 117 may store payment data pertaining to the user 101 or alternatively or additionally advertisement data pertaining to an advertised product.

The merchant computing system 130 represents a system that offers products and/or services for the user 101 to purchase or use. For example, the merchant system 130 may be a non-physical location, such as a virtual merchant storefront where a user 101, such as a customer, may purchase products. In certain example embodiments, the merchant system 130 includes a point-of-sale ("POS") terminal 134, such as a payment terminal at a merchant storefront that provides products. The point-of-sale terminal 134, for example, may be operated by a salesperson that enters purchase data into the point-of-sale terminal 134 to complete a purchase transaction. As used herein, "product (s)" can include, for example, any tangible or intangible products, as well as services.

The merchant computing system 130 may also include a merchant server 135, which in certain example embodiments may represent the computer-implemented system that the merchant system 130 employs to create and assemble a website 136 and content for the website 136. The merchant server 135 may also represent the computer-implemented system that the merchant system 130 employs to transmit to purchase transaction information, such as transaction authorization requests, to acquires, financial account issuers, credit card networks, and any other entities that may be involved in (or have a commercial interest in) the purchase transaction between the user 101 and the merchant system 130. The merchant server 135, for example, may also represent the computer-implemented system that the merchant system 130 employs to create advertisement content for products of the merchant system 130, such as products offered for sale on the website 136 of the merchant system 130.

The payment processing system 140 represents a system for processing direct product purchases of a merchant product associated with an advertisement of a merchant system 130. The payment processing system 140 is configured to interact with and receive data and information from the user computing device 110 via the network 105. For example, the payment processing system 140 receives data and information from the payment processing application 112 on the user device 110, such as information regarding the user device 110 and user inputs regarding advertisements that the payment processing application 112 presents to the user 101. The payment processing system 140 is also configured to communicate with the merchant system 130, such as via the network 105.

The payment processing system 140 can include a web sever 141, which may represent the computer-implemented system that the payment processing system 140 employs process direct purchases as described herein. For example, the web sever 141 may represent the computer-implemented system that the payment processing system 140 uses to receive a direct purchase option selection of a user 101 as described herein. As such, the merchant identification system 140 and associated web server 141 may be configured to receive and/or obtain information from a user device 110, for example, such as from the payment processing application 112 and/or communication application 113 via the network 105. The web sever 141 may also represent the computer-implemented system that the payment processing system 140 employs to automatically complete a purchase transaction on behalf a user 101 as described herein.

The payment processing system 140 may also include a website 142 and a user account 143. A user 101, for example, may utilize a user interface of the website 142 to register with the payment processing system 140 and to create a record with the payment processing system 140, such as the user account 143. For example, the user 101 may associate information about the user 101 with the user account 143, which allows the payment processing system 140 to facilitate a direct purchase of a product for the user 101. For example, the user 101 may associate shipping and payment information with the user account 143 as described herein.

The payment processing system 140 may also include an accessible data storage unit 147. In certain example embodiments, the data storage unit 147 stores user account information received via user 101 registrations. Additionally or alternatively, the data storage unit 147 stores advertising information and/or product information relating to direct purchases of the user 101. The exemplary data storage unit 147 can include one or more tangible computer-readable media. The data storage unit 147 can be stored on the payment processing system 147 or can be logically coupled to the payment processing system 147. For example, the data storage unit 147 can include on-board flash memory and/or one or more removable memory cards or removable flash memory.

In certain example embodiments, the payment processing system functions of the payment processing system 140 operate and execute fully and completely on the user device 110, such as within, or as a companion application to, the payment processing application 112. Alternatively, the payment processing functions of the payment processing system 140 may operate and execute separately and independently from the user device 110. For example, the payment processing system 140 may operate and execute within a separate computing system or other computing system that processes direct purchases as described herein. Alternatively, the payment processing functions of the payment processing system 140 may execute partially on the user device 110 and/or partially on a separate computing system. For example, the payment processing functions of the payment processing system 140 may occur both via a separate payment processing system 140 and the payment processing application 112 on the user device 110.

It will be appreciated that the network connections shown are example and other means of establishing a communications link between the computers and devices can be used. Moreover, those having ordinary skill in the art and having the benefit of the present disclosure will appreciate that the user device 110, merchant system 130, and payment processing system 140 of FIG. 1 can have any of several other suitable computer system configurations. For example, a user computing device 110 embodied as a mobile phone or handheld computer may not include all the components described above.

Example Processes

The components of the example operating environment 100 are described hereinafter with reference to the example methods illustrated in FIGS. 2-4.

Figure 2:
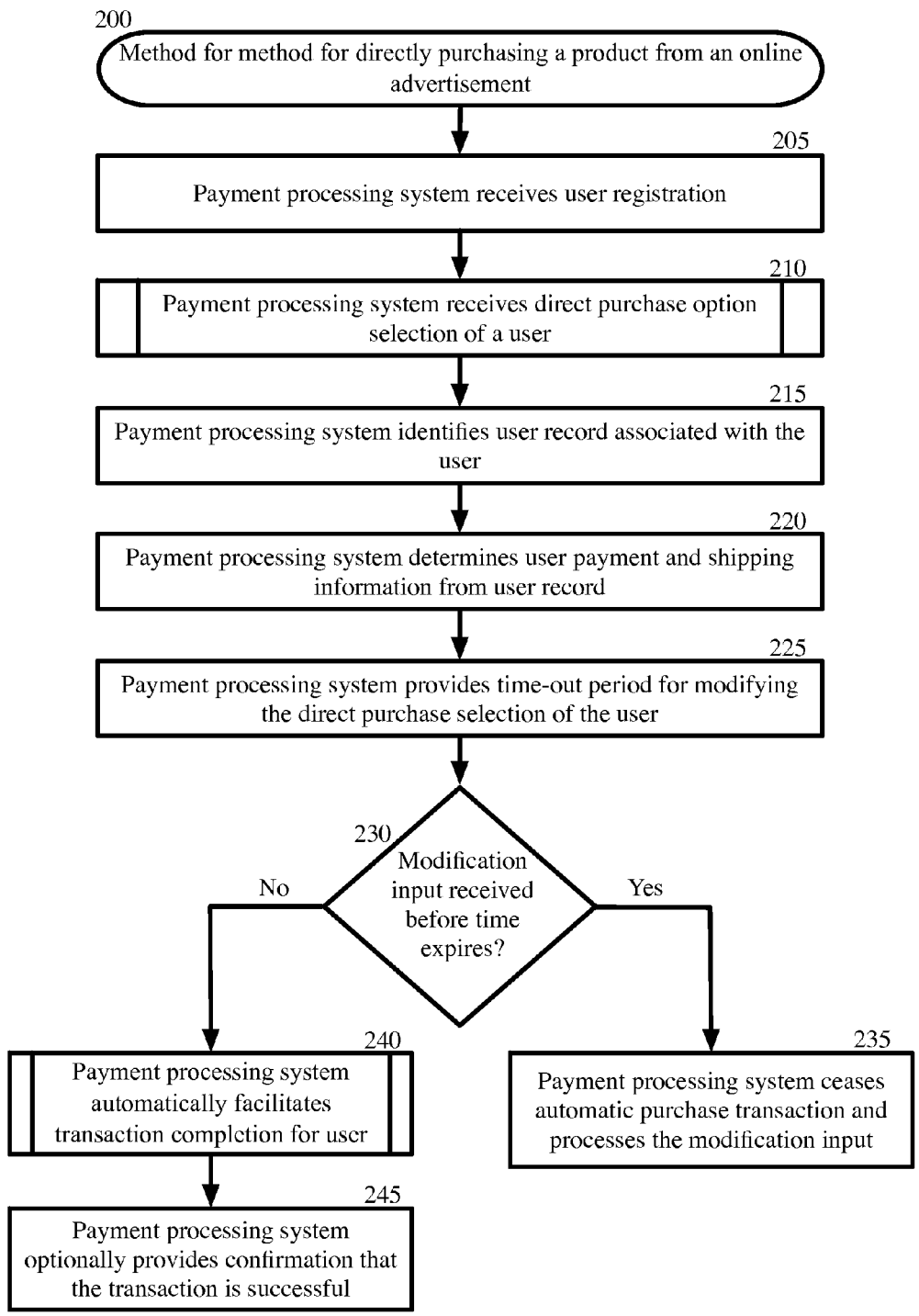
FIG. 2 is a block flow diagram depicting a method for directly purchasing a product from an online advertisement, in accordance with certain example embodiments.

FIG. 2 is a block flow diagram depicting a method 200 for direct product purchasing, in accordance with certain example embodiments.

With reference to FIGS. 1 and 2, in block 205, the payment processing system 140 receives user 101 registrations from one or more users 101. For example, a user 101 employs a user device 110 to accesses the website 142 of the payment processing system 140 to request an account. The user device 110 of the user 101 then transmits a request for a user account 143 via the network 105 to the payment processing system 140, and the payment processing system 140 receives the request. The payment processing system 140 then creates an account for the user 101, which provides a record for the particular user 101.

As part of the registration process, a particular user 101 may provide the user's name and other information so that the payment processing system 140 can process a direct product purchase request for the user 101 as described herein. For example, the user 101 may provide billing information, such as a billing address associated with a user account 143. The user 101 may also provide shipping information, such as a shipping address to receive products associated with a user account 143.

The user 101 may also associate with the user account 143 of the payment processing system 140 a financial account, such as a digital wallet account (not shown) of the user 101. The user 101 may then associate with the digital wallet account one or more bank account debit cards, credit cards, gift cards, loyalty cards, stored value cards, prepaid cards, store rewards cards, or any other type of financial account that the user 101 can employ to make a purchase or redeem value-added services with a payment account of the user 101. The user 101 may also provide or select rules for the digital wallet account, such as which specific financial account the payment processing system 140 is to use when completing a direct product purchase transaction for the user 101. In certain example embodiments, the user account 143 may include an account number associated with user's digital wallet account, which the payment processing system 140 can provide, for example, to a merchant system 130 when making a direct product purchase transaction.

In certain example embodiments, to obtain the benefits of the methods and techniques described herein, the user 101 may have to select a setting on the user device 110. Additionally or alternatively, the user 101 may have to install an application on the user device 110, such as the payment processing application 112, which allows the payment processing system 140 to receive payment information from the user device 110 of the registered user 101.

In block 210, the payment processing system 140 receives a direct purchase option selection of a user 101. That is, as a registered user 101 conducts online activity, such as when browsing various websites or searching for a product online, the user 101 is presented with one or more advertisements for various products on a user interface of the user device 110, such as a user interface of the web browser 114. After receiving a product advertisement, the payment processing application 112, for example, associates an input option for the user 101 to directly purchase the advertised product from the advertisement. The user 101 then provides a user input on the user device 110, indicating a desire to directly purchase the advertised product, and the payment processing system 140 receives the direct purchase option selection. Example details of block 210 are described hereinafter with reference to FIG. 3.

Figure 3:
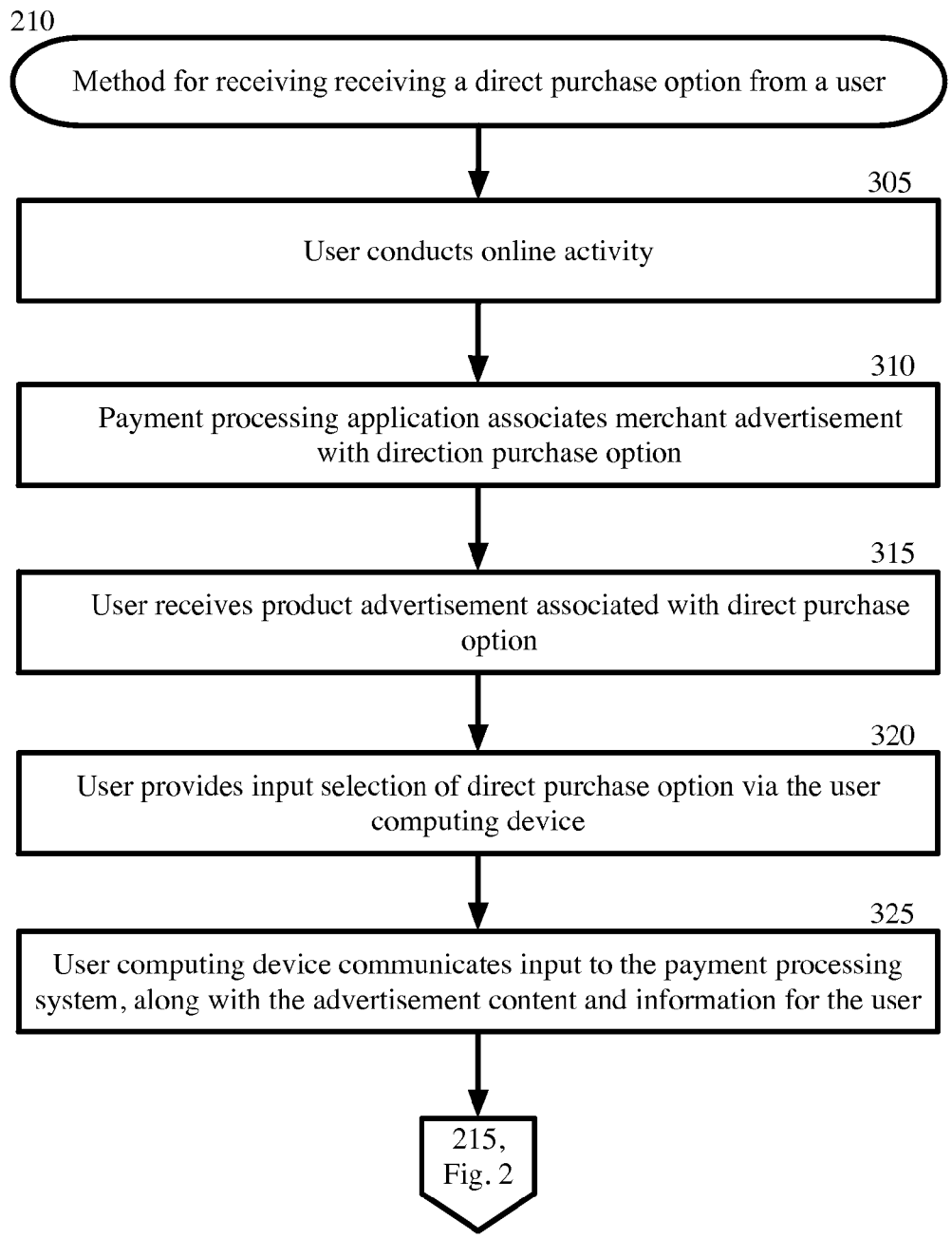
FIG. 3 is a block flow diagram depicting a method for receiving a direct purchase option from a user, in accordance with certain example embodiments.

FIG. 3 is a block flow diagram depicting a method 210 for the payment processing system 140 to receive a direct purchase option selection of a user, as referenced in block 210 of FIG. 2.

With reference to FIGS. 1 and 2, in block 305 of method 210, a user 101 conducts online activity using the user device 110. For example, the user 101 conducts online searching for a product, such as using the web browser 114 of user device 110 to locate a product using one or more search engines. Additionally or alternatively, the user 101 may also visit a website 136 when looking for a product. Additionally or alternatively, the user 101 may conduct other online activity, such as visiting social network websites or checking email via the web browser 114 of the user device 110.

In block 310, the payment processing application 112 associates a merchant advertisement with a direct purchase option. For example, as the user 101 conducts online activity, the user interface of the web browser 114 presents advertisements to the user 101. For example, the advertisements can be communicated to the user device 110 periodically or continuously updated from the merchant system 130 or other system, such as an offer provider (not shown) as the user 101 conducts online activity. As the advertisements are presented to the user 101, for example, the payment processing application 112 receives the advertisements. In certain example embodiments, the payment processing application 112 may access stored advertisements, such as advertisements stored in the data storage unit 117 based on prior online activity of the user 101. In certain example embodiments, the payment processing application 112 may search or query for advertisements from merchant systems 130, such as via a website 136 of the merchant system 130.

After receiving an advertisement, the payment processing application 112 associates or links the advertisement with a direct-purchase option, which allows the user 101 to directly purchase the advertised product from the advertisement. For example, the associated option may allow the user 101 to directly "click" or "tap" the advertisement, thus providing an input indicating that the user 101 intends to purchase the advertised product. In certain example embodiments, the user 101 may employ a mouse to hover, for example, over the advertisement and then to "click" the advertisement. Additionally or alternatively, the option may include a selectable, user control option, such as an "instant buy," "buy now," "direct purchase," "buy with digital wallet," "click to buy," or other user control button that user 101 can select as a direct purchase option.

In block 315, the user 101 receives the product advertisement associated with direct purchase option. That is, as the user 101 conducts online activity, one or more of the advertisements presented to the user 101 on the user interface the web browser 114 of the user device 110 is linked to the direct purchase option as described above, such that the user 101 receives the advertisement with the direct purchase option. In other words, conducting online activity as described herein results in the display of an advertisement for a product on a user interface of the user device 110, such that the user can select the advertisement and hence initiate a direct purchase of the advertised product. For example, the user 101 may view an advertisement for a product on a user interface of the user device 110, along with "instant buy," "buy now," "direct purchase," "buy with digital wallet," "click to buy," or other user control button indicating the ability to directly purchase the advertised product.

In block 320, the user 101 provides an input selection of the direct purchase option via the user device 110. That is, after the user 101 receives the advertisement with the direct purchase option as described herein, the user 101 chooses the direct purchase option. For example, the user 101 "clicks" or "taps" the advertisement directly or "clicks" or "taps" the user control button, such as the "instant buy," "buy now," "direct purchase," "buy with digital wallet," "click to buy," or other user control button. By providing the input on the advertisement or control associated therewith, such as the "click," "tap," or other input, the user provides an indication that the user desires to purchase the advertised product directly from the advertisement.

In block 325, user device 110 communicates the input selection of the user 101 to the payment processing system 140, along with the advertisement content and information for the user. That is, based on the input provided by the user 101 to the user device 110, the user device 110 transmits the selection of the user 101 of the direct purchase option to the payment processing system 140, such as via the payment processing application 112 and the network 105. And, so that the payment processing system 140 can identify both the user 101 providing the input selection and the merchant system 130 providing the advertised product, the user device 110 transmits identifying information of the user 101 and the advertisement content to the payment processing system 140. For example, the payment processing application 112 may determine information identifying the user 101 based on login information of the user 101, such as if the user 101 logs in to the user account 143 and/or the payment processing application 112. Additionally or alternatively, the payment processing system 140 may rely on any other means to identify the user 101, such as an identifier associated with the user device 110, a media access control address (MAC address), or an Internet Protocol address (IP address) of the user device 110. Additionally or alternatively, the payment processing system 140 may determine information identifying the user 101 via cookies associated with the user device 110, such as cookies stored on the user device 110 from a prior user login to the user account 143 of the payment processing system 140.

In certain example embodiments, in addition or alternatively to transmitting the advertisement content to the payment processing system 140, the user device 110 may transmit metadata associated with the advertisement to the payment processing system 140. The metadata may include, for example, information identifying the merchant system 130 offering the advertised product for sale. Additionally or alternatively, the payment processing system 140 may, as described below, read the advertisement content to determine the name of the merchant system 130 providing the advertised product. Based on the transmitted user information, advertisement content, and/or advertisement metadata, the payment processing system 140 receives the user information, advertisement content, and/or advertisement metadata, such as via the network 105.

Returning to block 215 of FIG. 2 of method 200, the payment processing system 140 identifies the record of the user 101, such as the user account 143 associated with the user 101. That is, based on the information received for the user 101 from the user device 110, the payment processing system 140 matches the received user information against stored user accounts 143 of a plurality of registered users 101 to identify the specific user 101 selecting the direct purchase transaction. In other words, the payment processing system 140 reads or scans user account 143 records to identify the particular user account 143 that matches the received information for the user 101. For example, the payment processing system 140 may receive the name of the user 101 from the user device 110, and hence determine a user account 143 that matches the name of the particular user 101 received from the user device 110.

In block 220, in certain examples embodiments the payment processing system 140 determines user payment and shipping information from the user record 143. For example, based on the registration information of the user 101, the payment processing system 140 can determine payment information for the user 101 that has been associated with the user account 143, along with the user's shipping address. Based on the rules associated with the user account 143, for example, the payment processing system 140 can select a financial account to pay for the purchase of the advertised product. In certain example embodiments, the payment processing system 140 communicates the determined payment and shipping information of the user 101 to the user device 110 via the network 105, so that the payment processing application 112, for example, can present the payment and shipping information to the user 101 for verification as described below.

In block 225, the payment processing system 140 provides a time-out period for modifying the direct product purchase selection of the user 101. That is, after identifying the user account 143 of the user 101, the payment processing system 140 affords the user 101 a window of time in which the user 101 can modify the direct purchase selection of the user 101. In other words, the time-out period provides the user 101 with an opportunity to change or cancel the direct product purchase selection that initiated the direct purchase transaction for the advertised product. In certain example embodiments, the length of the time-out period may be configured to correspond to the advertised price of the advertised product. For example, a higher advertised price may correspond to a longer time-out period, whereas a lower advertised price might correspond to a shorter time-out period. In certain example embodiments, the length of the time-out period may be configured to correspond to user preferences. For example, a user 101, such as a user 101 that routinely purchases products online, may prefer a shorter time-out period. Hence, such a user 101 may, in certain example embodiments, select a setting, such as a setting associated with the user account 143, to shorten the time-out period.

During the time-out period, the payment processing application 112, for example, provides the user 101 with a modification input option to change the transaction, such as a user control option to "change," "modify," "revise," or "cancel" the transaction before the time-out period expires. The user 101 can then select the user control option to modify the direct purchase option, such as by "clicking," "tapping," or otherwise choosing the user control option. The user device 110 then transmits the user's modification input to the payment processing system 140, such as via the payment processing application 112 and the network 105, and the payment processing system 140 receives the modification input. By providing the modification input before expiration of the time-out period, the user 101 can modify the initial direct product purchase selection before the payment processing system 140 automatically completes the direct product purchase option on behalf of the user 101 as described herein.

In certain example embodiments, in addition to presenting a modification input option on the user device 110, the payment processing application 112 may present on a user interface of the user device 110 any other information that may be useful for the user 101 during the time-out period. For example, the payment processing application 112 may present the user's payment and/or shipping information to the user 101 via the user device 110. That is, the payment processing application 112 may display the user's payment and/or shipping information alongside or with a "modify" or "cancel" control option on a user interface of the payment processing application 112. Based on the presented information, the user 101 can thus verify the accuracy of the payment and shipping information to be used in the purchase transaction, and, if needed, modify or cancel the transaction.

For example, based on the presented payment and/or shipping information of the user 101, the user 101 may determine that certain information needs to be modified, such as the financial account to be used to pay for the advertised product. Additionally or alternatively, after reviewing the shipping address the user 101 may determine that the product needs to be shipped to a different address. Additionally or alternatively, the user 101 may choose to modify the direct product purchase transaction by canceling the direct purchase transaction during the time-out period. The user 101 thus provides a modification input, for example, to "cancel" the transaction, and the payment processing system 140 receives the modification input.

In certain example embodiments, the payment processing application 112 may also display a time-out clock on a user interface of the user device 110, such as on a user interface of the payment processing application 112. For example, the clock may countdown from a configurable time—such as a countdown (in seconds) from 10, 20, 30, 40, 50, 60 or more seconds—to zero, at which time the time-out period expires. That is, expiration of the countdown clock coincides generally with the expiration of the time-out period, thus informing the user 101 that the time-out period for modifying the transaction has expired. By monitoring the countdown clock, the user 101 can determine the amount of time remaining for modification of the initial direct purchase selection. Alternatively, after providing the input to purchase the advertised product or after reviewing any verification information, the user 101 may navigate away from the advertisement, such as to a different website. That is, the user 101 does not have to wait while the time-out period to expires. Instead, the payment processing system 140 determines the expiration of the time-out period and then automatically completes the purchase transaction on behalf of the user 101. Alternatively, the user 101 may close the web browser 114 displaying the advertisement, for example, and in certain example embodiments open another application.

In block 230, if the payment processing system 140 receives a modification input from the user device 110, the method follows the "yes" branch of block 230 to block 235 of method 200. That is, based on the received modification input, the payment processing system 140 determines that the user 101 desires to modify the direct product purchase selection of the user 101. For example, if the user 101 selects a "modify" user control option before time expires is received before the time-out period expires, the payment processing system 140 determines that user 101 desires to modify the purchase transaction, such as by changing the user's payment of shipping information. If, however, the payment processing system 140 determines that the user 101 does not desire to modify the direct product purchase, the method follows the "no" branch of block 230 to block 240 of method 200.

In block 235, the payment processing system 140 ceases the automatic purchase transaction and processes the modification input of the user 101. That is, in response to receiving a modification input for the user device 110 before the time-out period expires, the payment processing system 140 does not automatically complete the purchase transaction on behalf of the user 101. Instead, if the payment processing system 140 receives a modification input to "cancel" the direct purchase transaction, the payment processing system terminates the automatic purchase transaction entirely. In which case, in certain example embodiments the payment processing system 140, such as via the payment processing application 112, may provide a notification on the user device 110 that the transaction was terminated.

If the modification input is associated with a user's selection of a "modify" or "revise" user control option, for example, the payment processing system 140 provides the user 101 with an opportunity to modify the information associated with the direct purchase transaction. For example, the payment processing system 140 may, such as via the payment processing application 112, direct the to a user interface of a web browser 114 where the user 101 can modify the direct purchase transaction. For example, the user 101 may employ the user interface to modify or update the payment and/or shipping information for the purchase transaction. The user 101, for example, may select a different financial account to fund the transaction or may select or provide a different shipping or billing address. Based on the user's input of updated information, for example, the user device 110 transmits the information to the payment processing system 140, and the payment processing system 140 receives the information. In certain example embodiments, the payment processing system 140 then proceeds to complete the purchase transaction on behalf the user 101, using the updated or modified information, as described in block 240 of method 200.

In block 240, the payment processing system 140 automatically facilitates transaction completion for user 101. That is, if the payment processing system 140 does not receive a modification input before the time-out period expires, the payment processing system 140 completes the purchase transaction for the user 101 without the user 101 having to enter any additional information. In other words, by selecting the direct purchase option and allowing the time-out period to expire, the user 101 can purchase the advertised product without any further input. For example, a user can provide a single "click" to purchase an advertised product, without having to navigate through multiple websites to actually purchase the product.

To automatically complete the purchase transaction for the advertised product with the merchant system 130, the payment processing system 140 uses the information in the user account 143, such as the payment and shipping information of the user 101. The payment processing system 140 also relies on the content of the advertisement, as well as any metadata associated with the advertisement, to identify the merchant system 130 advertising the product. For example, the payment processing system 140 determines the identity of the merchant system 130 providing the advertisement, and communicates information regarding the transaction to the merchant system 130. After completing payment for the advertised product, the payment processing system 140 provides the user shipping information to the merchant system 130, along with payment for the product. The merchant system 130 then provides the product to the user 101. Example details of block 240 are described hereinafter with reference to FIG. 4.

In block 245, in certain example embodiments, the payment processing system 140 optionally provides confirmation to user 101 that the transaction is successful. That is, after completing the payment transaction with merchant system 130, the payment processing system 140 may notify the user 101 that payment transaction was completed and that the merchant system 130 has or will ship (or provide) the advertised product to the user 101. For example, the payment processing system 140 may provide an indication to the payment processing application 112 that the transaction was successful. The payment processing application 112 may then present a notification via a user interface payment processing application 112 informing the user 101 that the direct purchase of the advertised product was successful. For example, the payment processing application 112 may display a "Transaction Successful!," "Transaction Complete!," or "Thanks for your purchase!" notification to the user 101. Additionally or alternatively, the payment processing system 140 may provide the user 101 with an email or text-message alert, for example, that the transaction was successfully completed.

Figure 4:
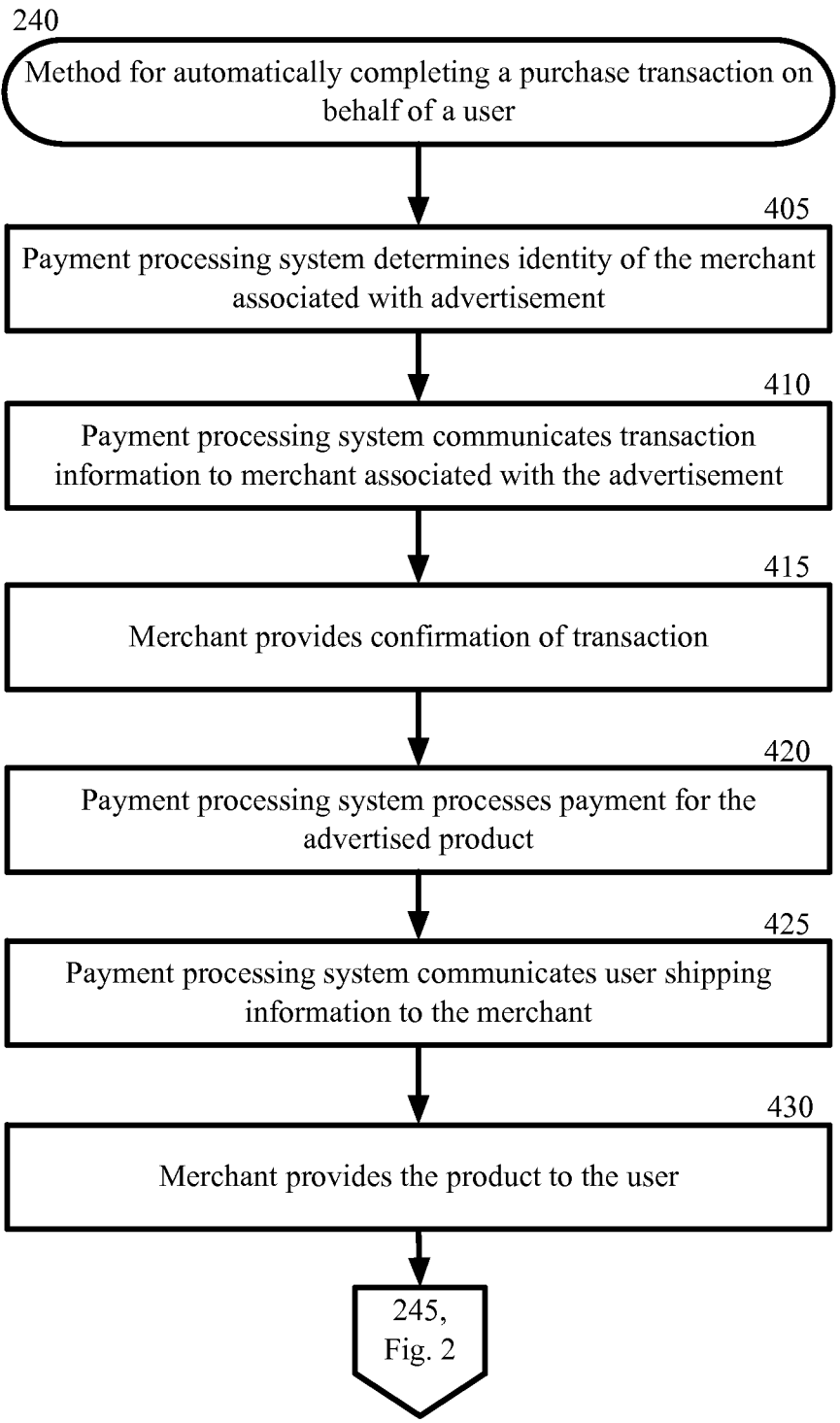
FIG. 4 is a block flow diagram depicting a method for automatically completing a purchase transaction on behalf of a user, in accordance with certain example embodiments.

FIG. 4 is a block flow diagram depicting a method 240 for the payment processing system 140 to automatically facilitate transaction completion for user 101, as referenced in block 240 of FIG. 2.

With reference to FIGS. 1 and 2, in block 405 of method 240, the payment processing system 140 determines the identity of the merchant associated with advertisement. That is, the payment processing system 140 reads the content of the advertisement to determine the merchant system 130 offering the advertised product. For example, the payment processing system 140 examines the text of the advertisement for the name of the merchant system 130 associated with the advertisement. Additionally or alternatively, the payment processing system 140 may read any metadata associated with advertisement to determine the identity of the merchant. For example, the metadata associated with the advertisement may contain a merchant identifier that can be used to identify the merchant.

In block 410, the payment processing system 140 communicates the purchase transaction information to merchant associated with the advertisement. For example, after identifying the merchant based on the advertisement, the payment processing system 140 transmits information regarding the advertised product to the merchant system 130 of the identified merchant via the network 105. The merchant system 130 can then confirm, for example, that it is in fact the correctly identified merchant system 130 advertising the product. The merchant system 130 can also verify that the advertised product is still available at the advertised price as described below. The payment processing system 140 can also transmit other transaction details associated with the direct product purchase transaction, such as the transaction amount to the merchant system 130.

In block 415, the merchant system 130 provides confirmation of the purchase transaction. For example, after receiving the purchase transaction information, the merchant system 130 reads the received information, such as to determine the advertised product. The merchant system 130 then, for example, determines that the advertised product is still available. Based on the availability of the advertised product, for example, the merchant system 130 notifies the payment processing system 140 that the merchant system 130 is able to complete the purchase transaction. For example, the merchant system 130 transmits the confirmation notification to the payment processing system 140 via the network 105.

In block 420, the payment processing system 140 processes payment for the advertised product. That is, after the payment processing system 140 receives confirmation of the transaction from the merchant system 130, the payment processing system 140 uses the financial account information of the user 101 associated with the user account 143 to provide payment to the merchant system 130 for the advertised product. For example, the payment processing system 140 charges the financial account of the user 101 for the advertised product and provides payment for the product to the merchant. The payment processing system 140 can then transfer payment for the purchase transaction to a financial account of the merchant system 130. Alternatively, a custodian of the user's financial account, such as the issuer of a financial account of the user 101, may transmit payment to the merchant system 130. For example, the payment processing system 140 can provide the issuer of the user's financial account with the financial account information of the merchant system 130. The issuer of the user's financial account can then transfer payment to the financial account of the merchant system 130, such as to an acquiring bank of the merchant system 130.

In certain example embodiments, the payment processing system 140 can transfer the financial account information of the user 101 to the merchant system 130. The merchant system 130 can then process payment directly with the custodian of the user's financial account, such as the issuer of the user's financial account. The issuer of the user's financial account, for example, then transfers payment to the financial account of the merchant system 130. The transmission of payment can be conducted immediately or at a time after the purchase transaction is conducted with a merchant. The payment can be transmitted via any suitable payment transmission system or method. For example, the payment processing system 140 and/or the merchant system 130 may process payment through traditional credit card channels and/or via a Transmission Control Protocol (TCP)/Internet Protocol (IP).

In block 425, the payment processing system 140 communicates shipping information of the user 101 to the merchant system 130. That is, after the payment processing system 140 determines the shipping information of the user 101 from the user account 143 as described herein—and after the payment processing system 140 processes payment for the advertised product—the payment processing system 140 transmits the shipping information of the user 101 to the merchant system 130. For example, the payment processing system 140 transmits the user shipping information to the merchant system 130 via the network 105. In certain example embodiments, such as when the merchant system 130 processes payment for the advertised product, the payment processing system 140 may transmit the shipping information of the user 101 to the merchant system 130 when transferring the financial account information of the user 101 to the merchant system 130.

In block 430, the merchant system 130 provides the product to the user 101. That is, after the merchant system 130 receives the shipping information of the user 101 from the payment processing system 140, the merchant system 130 sends to the advertised product to the user 101, such as to the received shipping address of the user 101. The user 101 then receives the advertised product, thus completing the purchase transaction.

Figure 5:
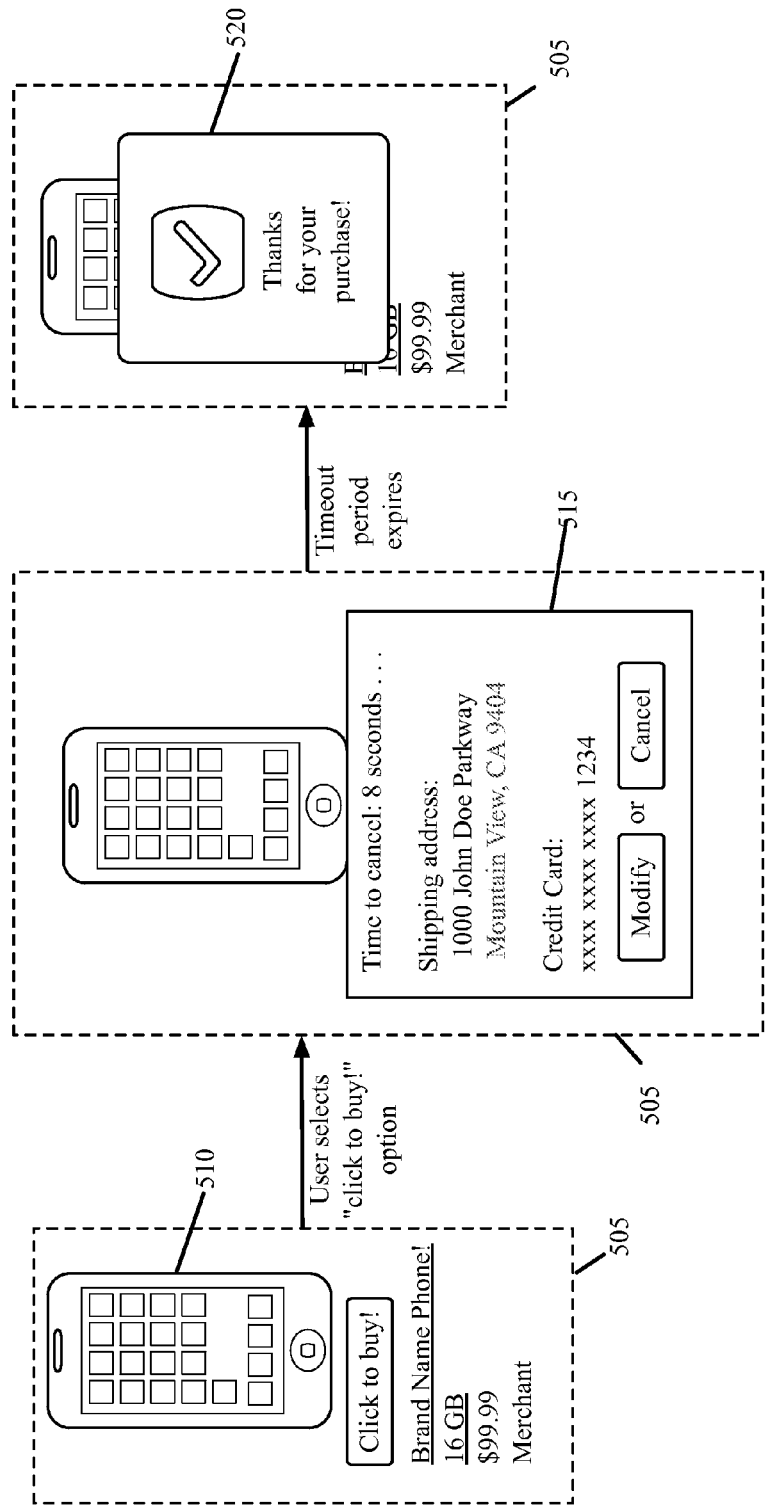
FIG. 5 is an illustration depicting a user interface for directly purchasing a product from an online advertisement, in accordance with certain example embodiments.

FIG. 5 is an illustration depicting a user interface 505 (or portion thereof) for directly purchasing a product from an online advertisement, in accordance with certain example embodiments.

As depicted in FIG. 5, as a user 101 conducts online activity, the user 101 is presented with an advertisement, such as a mobile phone advertisement 510. For example, the mobile phone advertisement 510 may include information about the advertised phone, such as the price and the identity of the merchant offering the phone for sale. After receiving the advertisement 510, the payment processing application 112 associates a direct purchase option with the advertisement 510 as described herein. In certain example embodiments, such as shown in FIG. 5, a user control button, such as a "click to buy" button, may be associated with the advertisement.

If the user 101 selects or "clicks" the "click to buy" button associated with advertisement 510, for example, the user 101 is provided with a time-out period to modify the user's selection to purchase the advertised mobile phone as described herein. For example, as depicted in FIG. 5, a time-out window 515 is provided on the user interface 505 (or portion thereof) to modify the user's selection to purchase the advertised mobile phone. As depicted, the example time-out period window 515 may include shipping information and credit card information of the user 101. The example time-out period window 515 also provides a "Time to cancel" clock, indicating the time remaining for the user 101 to cancel or modify the user's selection of the direct purchase option. As also depicted, the example time-out period window 515 includes user control buttons for the user 101 to either "Modify" or "Cancel" the user's selection of the option to purchase the mobile phone directly from the mobile phone advertisement 515.

If the time-out period expires, in certain examples the user 101 may be directed to a confirmation window 520 on the user interface 505 (or portion thereof). As depicted in FIG. 5, the confirmation window may inform the user 101 that the direct purchase of the mobile phone from the mobile phone advertisement 510 was successful. For example, the confirmation window 520 may thank the user 101 for the user's purchase. Alternatively, if the user 101 selects the "Modify" or "Cancel" button of the time-out period window 515 before time expires, the payment processing system 140 receives the modification input and processes the modification input as described herein. For example, the user 101 may be directed to another user interface (not shown) where the user 101 can modify the user's payment or shipment information before completing the purchase transaction.

In certain example embodiments, a user 101 may employ the methods and techniques described herein to concurrently purchase multiple advertised products. For example, the user 101 may, in quick succession, provide an input selection for two or more advertisements, thus resulting in two or more time-out periods that overlap (run concurrently) with each other. As the time-out periods expire, the payment processing system 140 automatically completes the purchase transaction for the advertised products on behalf of the user 101. In certain example embodiments, the payment processing system 140 may receive a modification input, such as a cancelation for one or more input selections, while the time-out periods run and then expire for other input selections of the user 101. That is, the payment processing system 140 can process multiple, direct purchase selections from a user 101, which in certain example embodiments includes providing the user 101 the opportunity to modify one or more of the user's input selections as described herein.

Other Example Embodiments

Figure 6:
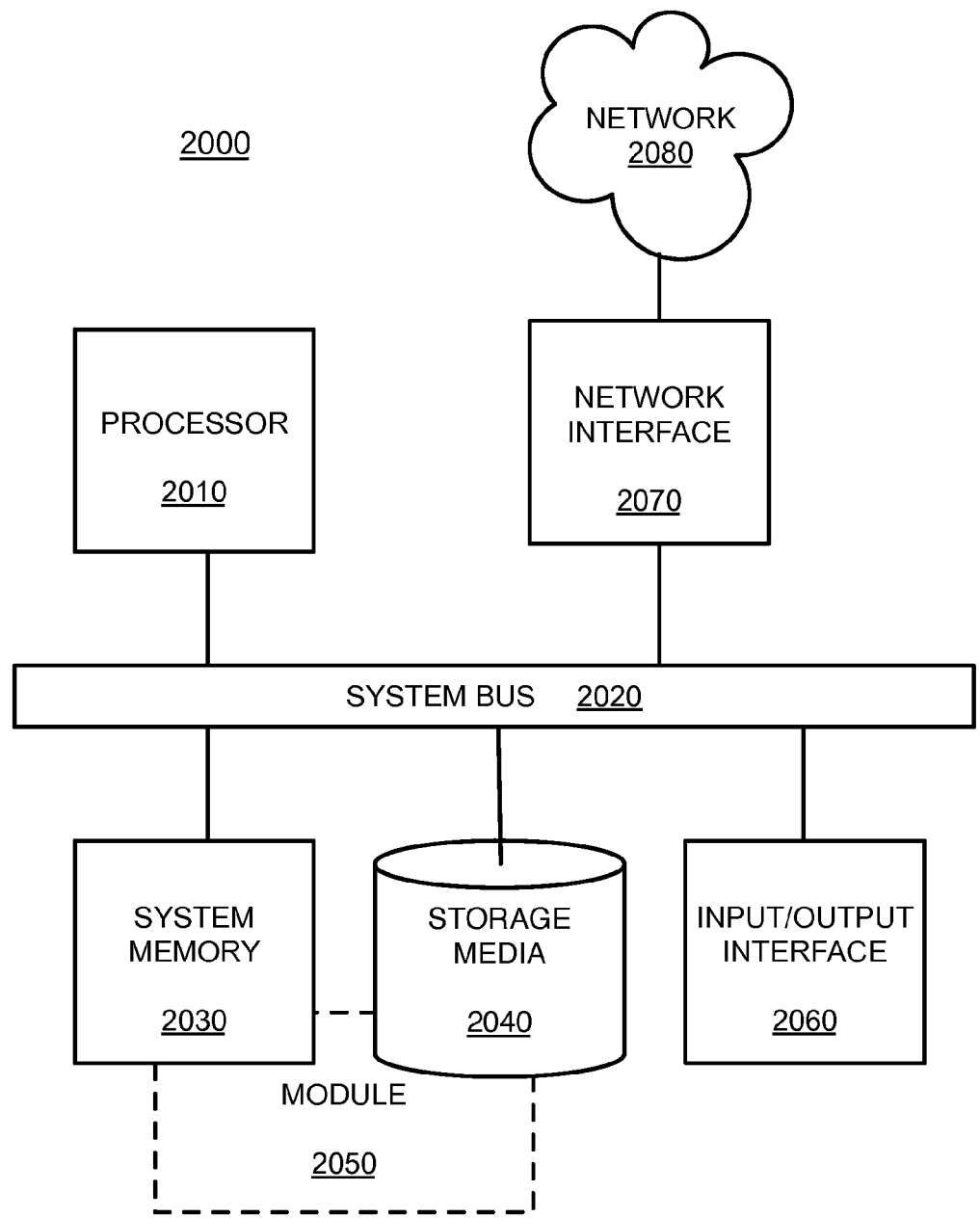
FIG. 6 is a block diagram depicting a computing machine and a module, in accordance with certain example embodiments.

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the examples described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method for direct product purchasing from advertisements after display of advertisements on user devices, comprising:
   receiving, by a payment processing application and a user interface, different than the payment processing application, on a remote computing device, one or more advertisements;
   identifying, by the payment processing application, the one or more advertisements displayed on the user interface of the remote computing device;
   updating, by the payment processing application, the user interface to associate a selectable direct-purchase option interface with the identified one or more advertisements, the direct-purchase option interface configured to detect selection of the one or more advertisements such that a user associated with the remote computing device may select the one or more displayed advertisements and initiate a direct purchase of a product or products associated with the one or more advertisements;
   detecting, by the payment processing application, a selection of the direct-purchase option,
   wherein the selection indicates an intent to purchase a product or service associated with the one or more advertisements;
   communicating, by the payment processing application and to a payment processing server, a payment account identifier for identifying a payment account stored on the payment processing server and associated with a user of the remote computer device, and advertisement information associated with the one more selected advertisements and
   automatically completing, by the payment processing server, a purchase of the advertised product from an online ordering system of the merchant associated with the selected advertisement based on the user information and the advertisement information provided by the payment processing application.

2. The method of claim 1, further comprising; updating, by the payment processing application, the user interface to display a modification input option that indicates a time out period to cancel or modify the selection prior to automatic completion of the purchase.

3. The method of claim 2, further comprising:
   detecting, by the payment processing application, a second selection of a second direct-purchase option interface associated with a second advertisement;
   updating, by the payment processing application, the user interface to display a second modification input option that indicates a time out period to cancel or modify the second selection on the user computing device;
   detecting, by the payment processing application, a modification input prior to expiration of the time out period; and
   updating, by payment processing application, the modification input option to enable modification to purchase information associated with the direct purchase option before automatically completing a purchase of a product or products associated with the second advertisement.

4. The method of claim 3, wherein the modification comprises a cancelation of the second selection of the second advertisement.

5. The method of claim 3, wherein the modification comprises a change to the shipment or payment information of the user.

6. The method of claim 1, further comprising; updating, by the payment processing application, the user interface to display a confirmation that the advertised product is to be automatically purchased after the time-out period has expired.

7. The method of claim 1, wherein the modification input option comprises count down clock wherein the count down clock indicates an amount of time remaining for the user to provide a modification input for modifying the selection.

8. The method of claim 1, wherein the advertisement information comprises metadata obtained from the one or more selected advertisements, the metadata comprising at least information identifying the merchant and a product or products associated with the selected one or more advertisements.

9. A system for direct product purchasing, comprising:
   a display device;
   a storage device; and
   a processor communicatively coupled to the storage device, wherein the processor executes application code instructions that are stored in the storage device to cause the system to:
   receive, by a payment processing application and a user interface, different than the payment processing application, on a remote computing device, one or more advertisements;
   identify, by the payment processing application, the one or more advertisements displayed on the user interface of the remote computing device;
   update the user interface to associate a direct-purchase option interface with the identified one or more advertisements, the direct-purchase option user interface configured to detect selection of the one or more advertisements;

detect a selection of the one or more advertisements via the direct-purchase option interface, wherein the selection indicates an intent to purchase a product or service associated with the advertisement;

update the user interface to display a modification input option in response to selection of the direct purchase option interface, the modification input option comprising an indication of a time-out period to cancel or modify the selection;

communicate, to a payment processing server after the time-out period has expired, identifying information associated with a user of the system to identify a payment account stored on the payment processing server, and advertisement information associated with the selected one or more advertisements.

10. The system of claim 9, wherein shipment or payment information of the user is presented on modification input option interface during the time-out period.

11. The system of claim 10, further comprising executing application code instructions that cause the system to:

detect a second selection of a second direct-purchase option interface associated with a second advertisement;

update, in response to receiving the second selection, the user interface to display a second modification input option interface comprising an indication of a second time-out period to cancel or modify the second selection;

detect, before the second time-out period expires, a modification input; and update, in response to receiving the modification input, the modification input option to enable modification to purchase information associated with the direct purchase option before automatically completing a purchase of product or service associated with the second advertisement.

12. The system of claim 11, wherein the modification comprises a cancelation of the second selection or a change to the shipment or payment information of the user.

13. The system of claim 9, wherein modification input option interface comprises a count down clock, wherein the count down clock indicates an amount of time remaining for the user to provide a modification input for modifying the selection on the user computing device of the option to directly purchase the advertised product.

14. The system of claim 9, wherein the advertisement information comprises metadata obtained from the one or more selected advertisements, the metadata comprising at least information identifying merchant and a product associated with the selected advertisement.

15. A computer program product, comprising:

a non-transitory computer-readable storage device having computer-executable program instructions embodied thereon that when executed by a computer cause the computer to update a user interface to associate direct purchase option interfaces with displayed advertisements to enable direct purchasing from the displayed advertisements, the computer-executable program instructions comprising:

computer-executable program instructions to receive, by a payment processing application and a user interface, different than the payment processing application, on a remote computing device, one or more advertisements;

computer-executable program instructions to identify, by the payment processing application, the one or more advertisements displayed on the user interface of the remote computing device;

computer-executable program instructions to update the user interface to associate a direct-purchase option interface with the one or more identified advertisements, the direct-purchase option interface configured to detect selection of the one or more advertisements;

computer-executable program instructions to detect a selection of the direct-purchase option, wherein the selection indicates an intent to purchase a product or service associated with the advertisement;

computer-executable program instructions to display, in response to receiving the selection, a modification input interface comprising a time-out period to cancel or modify the selection;

computer-executable program instructions to communicate to a payment processing server after the time-out period has expired, a payment account identifier to identify a payment account stored on the payment processing server, and advertisement information associated with the selected one or more advertisements.

16. The computer program product of claim 15, wherein shipment or payment information of the user is presented on the modification input option interface during the time-out period.

17. The computer program product of claim 16, further comprising:

computer-executable program instructions to detect a second selection of a second direct-purchase option interface associated with a second advertisement;

computer-executable program instructions to update the user interface to display a second modification input option interface comprising an indication of a second time-out period for modifying the second selection;

computer-executable program instructions to detect, before the second time-out period expires, a modification input at the second modification input option interface; and providing, in response to receiving the modification input, the second modification input user interface to enable modification to purchase information associated with the direct purchase option before automatically completing a purchase of the second advertised product.

18. The computer program product of claim 17, wherein the modification comprises a cancelation of the second selection.

19. The computer program product of claim 17, wherein the first selection from the user computing device and the second selection from the user computing device are received concurrently.

20. The computer program product of claim 15, wherein the advertisement information comprises metadata obtained from the one or more selected advertisements, the metadata comprising at least information identifying merchant and a product associated with the selected advertisement.

* * * * *